(12) United States Patent
Li et al.

(10) Patent No.: US 7,072,319 B2
(45) Date of Patent: Jul. 4, 2006

(54) METHOD AND SYSTEM FOR OPTIMALLY ALLOCATING ORTHOGONAL CODES

(75) Inventors: Jun Li, Richardson, TX (US); Mo-Han Fong, L'Orignal (CA); Derek K. Yu, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 759 days.

(21) Appl. No.: 10/028,476

(22) Filed: Dec. 19, 2001

(65) Prior Publication Data

US 2003/0112777 A1 Jun. 19, 2003

(51) Int. Cl.
*H04B 7/216* (2006.01)
*H04Q 7/20* (2006.01)
*H04Q 7/00* (2006.01)

(52) U.S. Cl. .................. 370/335; 370/329; 370/342; 455/450; 455/511

(58) Field of Classification Search ................ 370/208, 370/209, 335, 342, 441, 479; 455/450, 509, 455/511
See application file for complete search history.

(56) References Cited

U.S. PATENT DOCUMENTS

| | | | | |
|---|---|---|---|---|
| 5,787,080 | A * | 7/1998 | Hulyalkar et al. | 370/310.2 |
| 6,278,702 | B1* | 8/2001 | Deane et al. | 370/342 |
| 2002/0105929 | A1* | 8/2002 | Chen et al. | 370/335 |
| 2003/0021236 | A1* | 1/2003 | Kenney et al. | 370/250 |

\* cited by examiner

*Primary Examiner*—Steven H D Nguyen
(74) *Attorney, Agent, or Firm*—Carr LLP

(57) ABSTRACT

A method for allocating orthogonal codes, whereby the product of a number of active users in the system and the average number of sectors servicing each user is determined, and sufficient orthogonal codes are allocated to service the product of F and the optimal number of active users in the system. At least one message is transmitted for reception by at least one mobile station, the message indicating the number of allocated orthogonal codes.

27 Claims, 2 Drawing Sheets

METHOD AND SYSTEM FOR OPTIMALLY ALLOCATING ORTHOGONAL CODES

BACKGROUND

In the development of CDMA wireless systems that provide high rates of data transfer, such as next generation or 3G systems, adaptive modulation and coding are commonly used. Such schemes require mobile stations to send a channel estimation or data rate request to a base station. The base station then sends medium access control (MAC) information, such as power control information and the like, to each of the mobile stations in order to maintain the reverse links. In addition, the base station may send other MAC information to indicate the target user or transmission rate. The number of users that such a system can support may be limited by the number of MAC channels that the base station can transmit on the forward link.

Thus, a need has arisen for a system and method that permits a greater number of MAC channels to be utilized, to thereby increase system throughput and the number of users that may be serviced.

SUMMARY

The present invention, accordingly, provides a system and method for allocating orthogonal codes in a wireless telecommunications system, with reference to both an indication of number of active mobile users or stations in the system and an indication of the average number of sectors that each mobile user may obtain service from concurrently. In one embodiment, sufficient orthogonal codes are allocated to service the product of an indication of the average number of sectors the mobile users are concurrently obtaining service from and the number of active users in the system. At least one message is transmitted for reception by at least one mobile station, the message indicating the number of allocated orthogonal codes.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning CDMA systems and the like have been omitted inasmuch as such details are not considered necessary to obtain a complete understanding of the present invention, and are considered to be within the skills of persons of ordinary skill in the relevant art.

It is further noted that, unless indicated otherwise, all functions described herein are performed by a processor such as a computer or electronic data processor in accordance with code such as computer program code, software, and/or integrated circuits that are coded to perform such functions.

Figure 1:
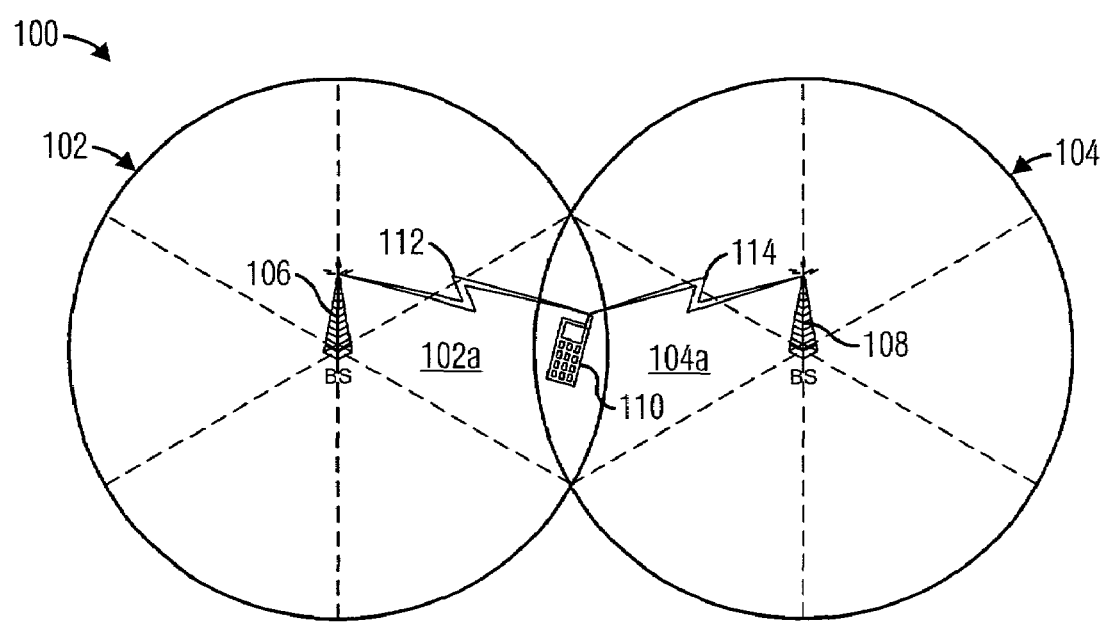
FIG. 1 is a high-level schematic diagram illustrating a portion of a wireless communications network.

Referring to FIG. 1 of the drawings, the reference numeral 100 generally designates a wireless communications network. The system 100 includes a plurality of cells, only two of which cells, designated by the reference numerals 102 and 104, are depicted. Each cell 102 and 104 defines six sectors, one of which is representatively designated in each cell by the reference numerals 102a and 104a, respectively. The cells 102 and 104 are illustrated as comprising six sectors each for purposes of illustration and not for purposes of limiting the invention. It will be apparent that the invention could be used with one or more cells, each having one or more sectors. Each cell 102 and 104 also includes a base station (BS) 106 and 108, respectively, centrally positioned within the respective cells 102 and 104. A mobile station (MS) 110 of a user (not shown) is shown positioned within an overlap portion of the two sectors 102a and 104a. The MS 110 is connected via wireless, or radio frequency (RF), communication links 112 and 114, respectively, to the BSs 106 and 108, respectively. While not shown, it is understood that a plurality of MSs, such as the MS 110, may be located at various positions within the cells 102 and 104. The structure and operation of a communications network is considered to be well known in the art and, therefore, will not be discussed in further detail herein, except insofar as necessary to describe the present invention.

In next generation CDMA wireless systems that support high speed data services, sixteen orthogonal channels, created by orthogonal codes, such as Walsh codes, are typically made available for use as data channels and control channels in the forward links of each sector. Channels are typically separately identified by a differentiating "length-16" (16 bit) or "short" Walsh code. Conventionally, two of the sixteen channels are allocated for use as control channels for transmitting MAC and power control information, for example, on a forward link of a wireless communications system, and the remaining fourteen channels are aggregated for transmitting data payload to users of MSs, such as the MS 110. This allocation effectively partitions available channels into one group of fourteen data channels and a second group of two control channels.

The present invention increases the capacity of one or more sectors, by adjusting the partition between data and control channels, to increase or decrease the number of control channels. An increase in the number of control channels can be accomplished by allocating one or more of the data channels to provide control data to MSs served by a sector. This may also be accomplished by effectively further subdividing each channel allocated to transmission of control data into additional channels, using "length-512" (512 bit) or "long" Walsh codes. Use of long Walsh codes will provide either 12 or 16 additional MSs to be serviced in place of a single MS over the conventional short Walsh code control channel. A decrease in the number of control channels can be accomplished by allocating one or more control channels to a short Walsh code data channel. Dynamic adjustment of the partition defining the number of data and control channels further optimizes a wireless system by providing additional control channels when traffic demands require.

Figure 2:
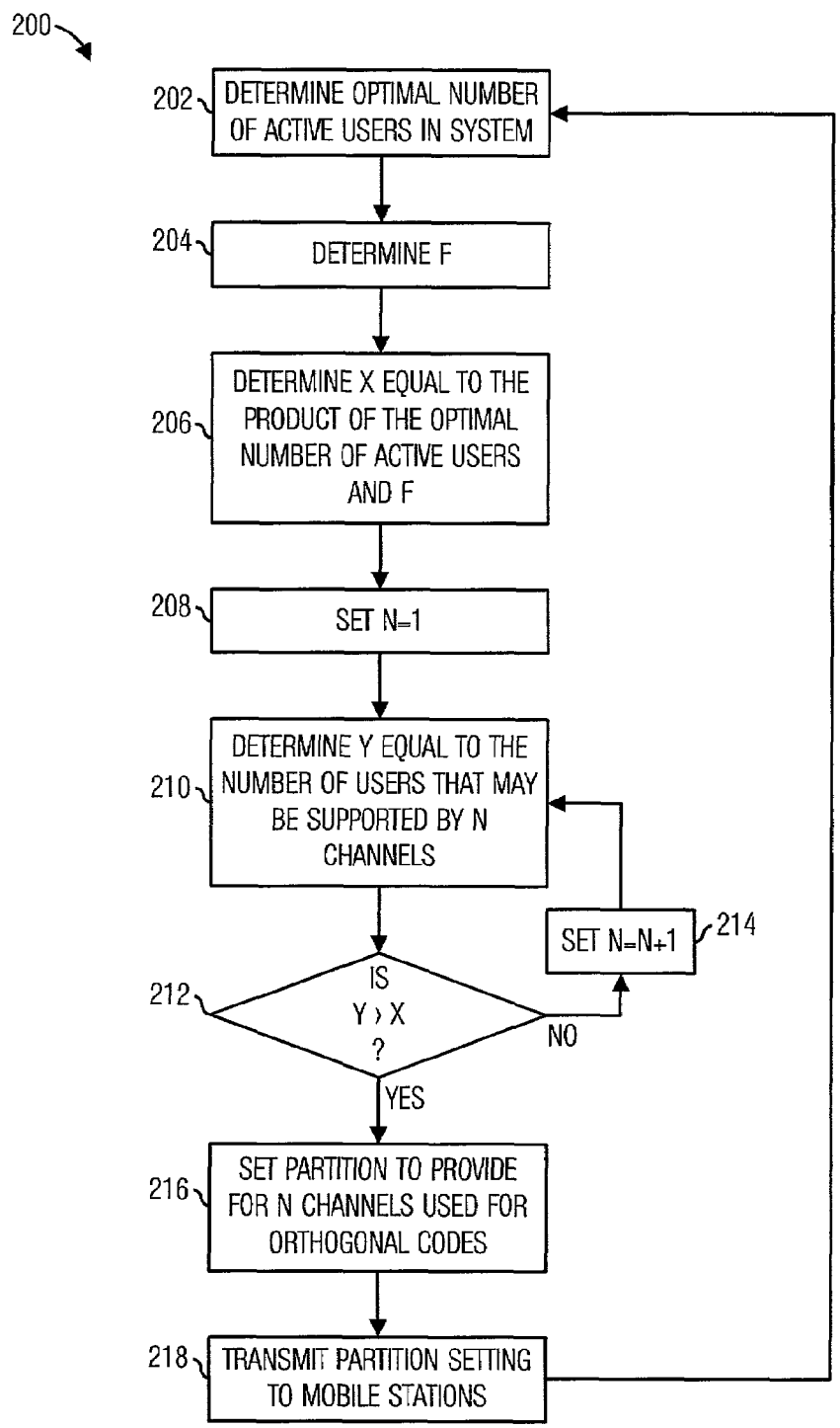
FIG. 2 depicts a preferred sequence of events which transpire during the partitioning of channels in accordance with the present invention.

FIG. 2 is a flowchart of control logic implemented by a BS 106 or 108 for dynamically allocating the sixteen orthogonal channels between data channels and control channels in accordance with the present invention. Because the BSs 106 and 108 operate substantially identically, the operation of each base station will be described representatively by reference to the BS 106. Accordingly, in step 202, the BS 106 determines the optimal number of active users that it is serving or may service in the system, the system being depicted in FIG. 1 as the sector 102a. The optimal number of active users may be determined by well-known techniques, frequently with reference to a number of factors, including, but not limited to, the average number of actual users requesting service in the sector, the throughput desired for the system, and the type of service (e.g., http, e-mail, ftp, stream, and the like) being requested by each user.

In step 204, a factor F is determined by using well-known techniques or is provided to BS 106. For example, factor F may be determined by reference to available management and control data concerning a relevant portion of the system 100. Factor F indicates the average number of sectors that each MS may obtain service from concurrently, such as in a simultaneous soft handoff. Alternatively, the BS 106 may use a predetermined factor F, such as two (2). In step 206, the BS 106 determines the effective number of users (i.e., MSs) to service, resulting from the product of the optimal number of active users determined in step 202 and the factor F determined in step 204. The effective number of users is equivalent to the number of data channels required.

In step 208, a variable N is set to 1 and, in step 210, the number of users that may be served by N control channels is determined, using well-known techniques. For example, if 512 bit Walsh codes are used for the orthogonal codes, then generally either 24 or 32 users may be serviced on each channel. Therefore, if N=2, then 48 or 64 users, respectively, could be serviced. In step 212, a determination is made of whether the number of users that may be serviced by N channels (step 210) is greater than the effective number of users (step 206). If it is determined that the number of users that may be serviced by N channels is not greater than the effective number of users, then execution proceeds to step 214; otherwise, execution proceeds to step 216. In step 214, N is increased by an increment of one (1), and execution returns to step 210.

In step 216, the 16 orthogonal channels are partitioned between data channels and control channels, so that N channels are allocated for use as control channels, and the remaining channels (remaining channels=16−N) are allocated for use as data channels. In step 218, a configuration message is transmitted for reception by all MSs in the system, such as the MS 110, indicating the placement of the partition. The configuration message is preferably sent periodically, for example, every 10 milliseconds, to thereby keep all MSs current on the placement of the partition so that data and control information is received on correct channels. The configuration message is preferably also sent to individual MSs during call setup. After a predetermined period of time has elapsed, such as an hour, that is suitable for changing traffic demands of the system 100, execution returns to step 202.

By the use of the present invention, data may be transmitted more efficiently to a greater number of active users to thereby attain a higher system throughput in high-speed data CDMA systems than is possible using conventional technology.

It is understood that the present invention may take many forms and embodiments. Accordingly, several variations may be made in the foregoing without departing from the spirit or the scope of the invention. For example, the present invention may be used with Universal Mobile Telecommunications System (UMTS).

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method for allocating orthogonal codes to users of mobile stations in a telecommunication system, the method comprising:

determining an effective number of mobile station users equal to the product of a number of active users in the system and a value relating to F, wherein F represents the average number of sectors that a mobile station may obtain service from concurrently;

allocating sufficient orthogonal codes to service the effective number of users; and transmitting for reception by at least one mobile station at least one message indicating the number of allocated orthogonal codes.

2. The method of claim 1 wherein the step of determining further comprises one of setting F to a predetermined value, or determining F with reference to management and control data concerning the system.

3. The method of claim 1 wherein the number of active users in the system is the optimal number of active users in the system.

4. The method of claim 1 wherein the step of determining further comprises determining an optimal number of active users in the system with reference to at least one of:

the number of users requesting service;

the throughput required of the system; and the type of service requested.

5. The method of claim 1 wherein the step of determining further comprises determining an optimal number of active users in the system with reference to at least one of:

the number of users requesting service;

the throughput required of the system; and the type of service requested, wherein the type of service includes at least one of http, ftp, e-mail, and streaming.

6. The method of claim 1 wherein the step of allocating further comprises:

setting a variable N equal to at least 1;

determining the number of users that can be supported by N channels;

determining whether the number of users that can be supported by N channels is greater than the effective number of users;

upon a determination that the number of users that can be supported by N channels is not greater than the effective number of users, incrementing N by 1, and returning to the step of determining the number of users that may be supported by N channels; and upon a determination that the number of users that can be supported by N channels is greater than the effective number of users, allocating N channels for orthogonal codes.

7. The method of claim 1 wherein the orthogonal codes are Walsh codes.

8. The method of claim 1 wherein the system comprises at least a sector of a cell.

9. The method of claim 1 applied to UMTS.

10. A base station configured for allocating orthogonal codes, the base station comprising:
    means for determining an effective number of users equal to the product of a number of active users in a system and a value relating to F, wherein F represents the average number of sectors that a mobile station may obtain service from concurrently;
    means for allocating sufficient orthogonal codes to service the effective number of users; and
    means for transmitting for reception by at least one mobile station at least one message indicating the number of allocated orthogonal codes.

11. The base station of claim 10 wherein the means for determining further comprises one of means for setting F to a predetermined value, or means for determining F with reference to management and control data concerning the system.

12. The base station of claim 10 wherein the number of active users in the system is the optimal number of active users in the system.

13. The base station of claim 10 wherein the means for determining further comprises means for determining an optimal number of active users in the system with reference to at least one of:
    the number of users requesting service;
    the throughput required of the system; and
    the type of service requested.

14. The base station of claim 10 wherein the means for determining further comprises means for determining an optimal number of active users in the system with reference to at least one of:
    the number of users requesting service;
    the throughput required of the system; and
    the type of service requested, wherein the type of service includes at least one of http, ftp, e-mail, and streaming.

15. The base station of claim 10 wherein the means for allocating further comprises:
    means for setting a variable N equal to at least 1;
    means for determining the number of users that can be supported by N channels;
    means for determining whether the number of users that can be supported by N channels is greater than the effective number of users;
    means, upon a determination that the number of users that can be supported by N channels is not greater than the effective number of users, for incrementing N by 1, and returning to the means for determining the number of users that may be supported by N channels; and
    means, upon a determination that the number of users that can be supported by N channels is greater than the effective number of users, for allocating N channels for orthogonal codes.

16. The base station of claim 10 wherein the orthogonal codes are Walsh codes.

17. The base station of claim 10 wherein the system is a sector of a cell.

18. The base station of claim 10 applied to UMTS.

19. A telecommunications system utilizing a computer program product having a medium with a computer program code for allocating orthogonal codes embodied thereon, the telecommunications system comprising:
    a digital processor for executing the computer program code stored on the medium for determining an effective number users equal to the product of a number of active users in the telecommunications system, and a value relating to F, wherein F represents the average number of sectors that a mobile station may obtain service from concurrently;
    allocating sufficient orthogonal codes to service the effective number of users; and
    transmitting one or more messages indicating the number of allocated orthogonal codes to one or more mobile stations from a base station.

20. The telecommunications system of claim 19 wherein F is one or both of a predetermined value and a value determined with reference to management and control data concerning the system.

21. The telecommunications system of claim 19 wherein the number of active users in the system is the optimal number of active users in the system.

22. The telecommunications system of claim 19 wherein the computer program code further comprises computer program code for determining an optimal number of active users in the system with reference to at least one of:
    the number of users requesting service;
    the throughput required of the system; and
    the type of service requested.

23. The telecommunications system of claim 19 wherein the computer program code further comprises computer program code for determining an optimal number of active users in the system with reference to at least one of:
    the number of users requesting service;
    the throughput required of the system; and
    the type of service requested, wherein the type of service includes at least one of http, ftp, e-mail, and streaming.

24. The telecommunications system of claim 19 wherein the computer program code further comprises:
    computer program code for setting a variable N equal to at least 1;
    computer program code for determining the number of users that can be supported by N channels;
    computer program code for determining whether the number of users that can be supported by N channels is greater than the effective number of users;
    computer program code, upon a determination that the number of users that can be supported by N channels is not greater than the effective number of users, for incrementing N by 1, and returning to the computer program code for determining the number of users that may be supported by N channels; and
    computer program code, upon a determination that the number of users that can be supported by N channels is greater than the effective number of users, for allocating N channels for orthogonal codes.

25. The telecommunications system of claim 19 wherein the orthogonal codes are Walsh codes.

26. The telecommunications system of claim 19 wherein the system is a sector of a cell.

27. The telecommunications system of claim 19 applied to UMTS.

* * * * *